United States Patent [19]
Dickey et al.

[11] Patent Number: 4,881,341
[45] Date of Patent: Nov. 21, 1989

[54] SPINNER FISHING LURE

[76] Inventors: Larry A. Dickey, 5755 East River Rd., #1514, Tuscon, Ariz. 85715; John J. Amsler, 3462 Dromedary Way, #1299, Las Vegas, Nev. 89115

[21] Appl. No.: 195,907

[22] Filed: May 19, 1988

[51] Int. Cl.⁴ ............................................. A01K 85/00
[52] U.S. Cl. .................................. 43/42.12; 43/42.14; 43/42.17; 43/42.19
[58] Field of Search ................. 43/42.11, 42.12, 42.13, 43/42.14, 42.17, 42.19

[56] References Cited

U.S. PATENT DOCUMENTS

| | | | |
|---|---|---|---|
| 849,743 | 4/1907 | Martin | 43/42.14 |
| 1,265,900 | 5/1918 | Foss | 43/42.17 |
| 1,503,901 | 5/1923 | Jones, Jr. | 43/42.14 |
| 1,617,318 | 2/1927 | Brown | 43/42.29 |
| 1,870,767 | 8/1932 | Brown | 43/42.29 |
| 1,943,283 | 1/1934 | Beil | 43/42.2 |
| 2,493,431 | 1/1950 | Wold | 43/42.19 |
| 2,497,807 | 2/1950 | Wood | 43/42.2 |
| 2,610,429 | 9/1952 | Thomas | 43/42.17 |
| 2,722,079 | 11/1955 | Johnson | 43/42.14 |
| 2,835,999 | 5/1958 | Gillian | 43/26.1 |
| 3,112,576 | 12/1963 | Tay | 43/42.14 |
| 3,127,694 | 4/1964 | Davis | 43/42.19 |
| 3,245,171 | 4/1966 | Henry | 43/42.1 |
| 3,439,443 | 4/1969 | Weimer | 43/42.2 |
| 4,099,343 | 7/1978 | Enz | 43/42.19 |
| 4,110,930 | 9/1978 | Daniels | 43/42.14 |
| 4,201,007 | 5/1980 | Backstrom | 43/42.12 |
| 4,201,008 | 5/1980 | Sparkman | 43/43.13 |
| 4,208,824 | 6/1980 | Maxwell | 43/42.19 |
| 4,447,980 | 5/1915 | Bassett | 43/42.14 |
| 4,637,158 | 1/1987 | Reid | 43/42.19 |

Primary Examiner—Nicholas P. Godici
Assistant Examiner—William Scott Andes
Attorney, Agent, or Firm—Quirk, Tratos & Roethel

[57] ABSTRACT

A fishing lure is provided with two spinners formed of ribbon or band-like members in the shape of either half loop or full loop elements. The spinners are pitched at an angle to the shaft of the lure so that the two spinners rotate about the axis of the shaft in opposite directions to mitigate twist or torque in the fishing line. The surface areas of the two spinners are approximately equal.

65 Claims, 4 Drawing Sheets

SPINNER FISHING LURE

BACKGROUND OF THE INVENTION

This invention relates to a fishing lure having spinner elements and more particularly to a fishing lure having dual spinner elements of a particular design that rotate about the axis of the lure in opposite directions.

The prior art is replete with fishing lures that utilize spinner elements as an aid in attracting fish. Typically, one or more spinners are attached to the shaft of the lure in a manner such that each spinner rotates about the axis of the shaft as the lure is retrieved through the water. It is also known to provide two spinners on the shaft oriented so that the spinners rotate in opposite directions to each other.

While the use of spinning elements on a lure apparently is attractive to fish, the torque from the spinning element on the shaft of the lure has a tendency to twist the fishing line. A twisted fishing line is more likely to not rewind properly on the reel.

SUMMARY OF THE INVENTION

The present invention comprises a shaft having means at one end for connecting the shaft to a fishing line and means at the other end for connecting a fishhook to the shaft. Two spinners are mounted on the shaft. Each spinner is a ribbon or band-like member formed either as a half-loop element or a full loop element and attached to the shaft at two locations. The spinners can be either curvilinear members or multiple straight segments. The spinners rotate about the axis of the shaft as the lure is retrieved through the water, one spinner rotating clockwise and the other spinner rotating counterclockwise or opposite to the direction of rotation of the first spinner. The rotation is achieved by slanting or pitching the surface of the ribbon or band at an angle to the direction of travel of the lure through the water.

It is an object of the invention to mitigate the twist or torque on the fishing line that is caused by the rotation of spinning elements about the axis of the shaft of the lure.

It is a feature of the invention to have dual spinning elements rotating in opposite directions about the axis of the shaft with the surface area of each spinning element being approximately equal so that the net torque or twist on the fishing line is approximately zero.

It is an advantage of the present invention that when the two opposite spinning elements have approximately equal surface areas, the torque or twist imparted to the fishing line by one spinning element is approximately cancelled out by the opposite torque or twist from the other spinning element thereby resulting in a net torque or twist of approximately zero which mitigates the tendency of the fishing line to twist.

It is a further object of the present invention to provide a fishing lure that will sway or wobble on its descent through the water whenever forward retrieval is interrupted.

It is a further feature of the present invention to have the spinning elements, formed in the shape of ribbon or band-like half or full-loop elements, attached to the shaft the lure at two points on the diameter of the loop which permits each spinning element to sway or wobble back and forth about the axis of the shaft as the lure descends through the water.

It is a further advantage of the present invention that this resulting sway or wobble of the spinning elements as the lure descends through the water will cause the entire lure to flutter or oscillate during its descent thereby imitating the appearance of live bait.

These and other objects, features and advantages will be apparent upon consideration of the following detailed description, drawings and claims.

DETAILED DESCRIPTION OF THE PREFERRED EMBODIMENT

Figure 3:
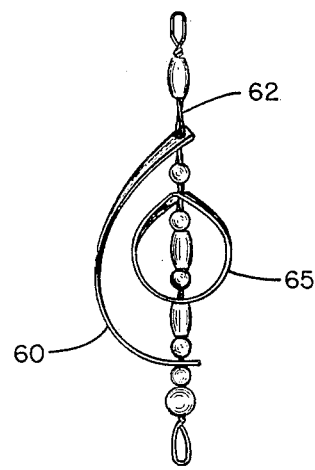
FIG. 3 shows an alternate embodiment having a single shaft with a full loop spinner mounted inside the span of a half loop spinner.

The fishing lure 10 of the present invention has a shaft 12 formed of wire or similar material. The wire may be a single strand, or alternatively, the shaft may be made from two strands of wire which are braided for additional strength (as shown in FIG. 3). The forward end of the shaft 12 has a first eyelet or ring 14 that is a means for connecting the lure 10 to a fishing line (not shown). The opposite or rearward end of the shaft 12 has a second eyelet or ring 16 that is a means for connecting a fishhook 13 to the lure 10. Any conventional connecting means can be used as the first ring 14 or the second ring 16 such as merely bending the end of the shaft back upon itself to form a loop. Any conventional fishhook can be attached to the shaft 12 including single or multiple fishhook arrangements with or without barbs.

Figure 1:
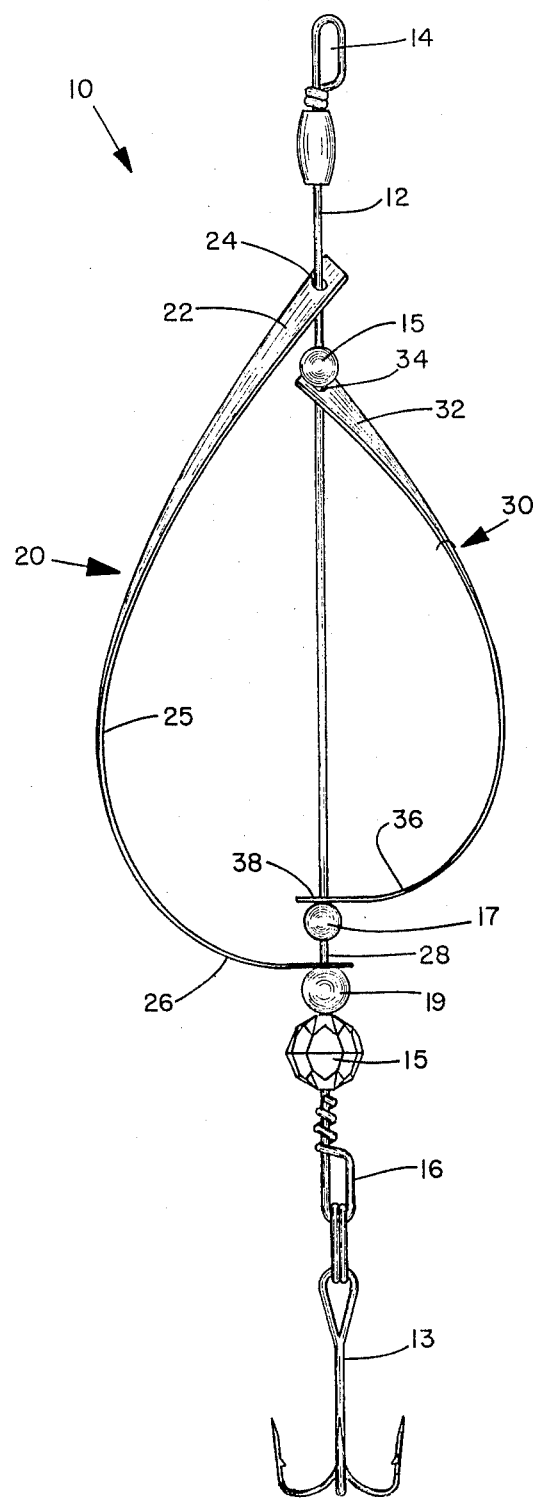
FIG. 1 shows an embodiment of the invention having a single shaft and two half-loop spinners, one mounted inside the span of the other.

The objects, features and advantages of the present invention are accomplished by mounting two spinner elements on the shaft 12. As shown in FIG. 1, a first spinner 20 is formed as a half loop element. The forward end 22 of the spinner has an aperture 24 for mounting the spinner at a first point on the shaft 12. The rearward end 26 of the spinner also has an aperture 28 for mounting the spinner at a second point on the shaft 12. Each aperture 24, 28 is larger than the diameter of the shaft so that the spinner 20 hangs loosely on the shaft 12.

Figures 11, 12:
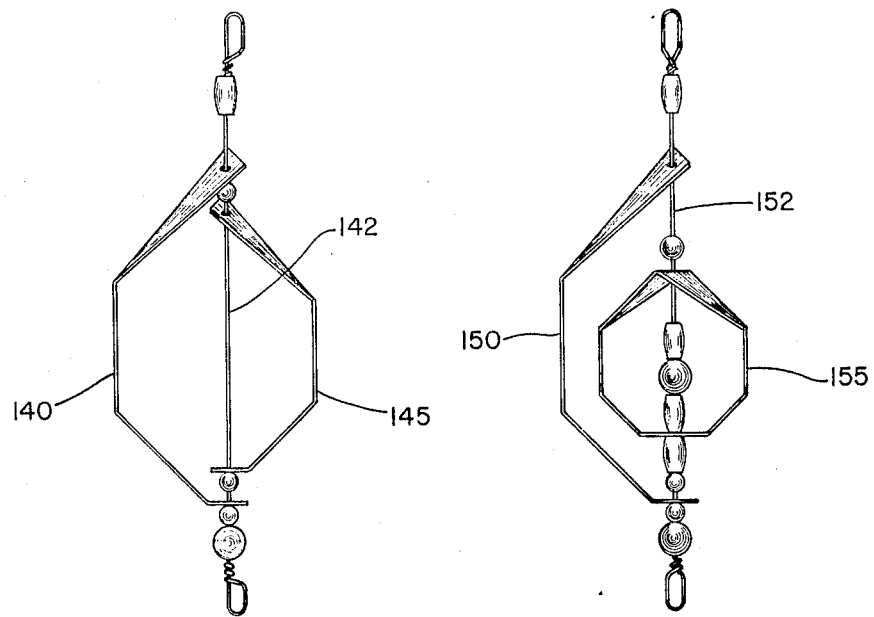
FIG. 11 shows an alternate embodiment of two half loop spinners in which each spinner is formed of multiple straight line segments.
FIG. 12 shows an alternate embodiment of a half loop spinner and a full loop spinner, each made of multiple straight line segments.

The first spinner 20 is formed in the shape of a ribbon or band and is made from any suitable metal or plastic material. Prior to being fabricated into a half loop, the spinner is in the shape of a rectangle. This rectangle is then bent into the shape of a half loop with the apertures 24, 28 punched or otherwise formed in each end. As shown, the spinner can be a generally curvilinear member, although the spinner may also be multiple straight line segments as shown in FIGS. 11 and 12. The plane of the surface of the spinner 20 at its rearward end 26 lies perpendicular, i.e., at a pitch angle of 90°, to the axis of the shaft 12 at the location at which the rearward end 26 of the spinner 20 is mounted to the shaft 12.

The plane of the surface of the forward end 22 of the spinner 20 is twisted or pitched at an angle to the axis of the shaft 12 which has a range greater than 0° and less than 90°. This pitched surface effects the rotation of the spinner 20 around the shaft 12 as the lure 10 is drawn through the water. The greater the angle of pitch from perpendicular, the faster the spinner will rotate. Preferably, the pitch angle is selected to be approximately 45°, as this pitch angle generates a faster rotation of the spinners, which in turn creates both movement and underwater "noise" which is both visually and audibly attractive to fish.

Figure 2:
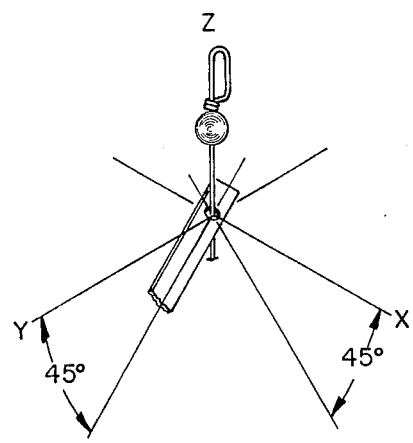
FIG. 2 shows a partial view of the present invention depicting the pitch angle at which the spinner intersects the shaft.

The desired pitch angle is measured at the location at which the x-y plane of the spinner 20 intersects with the shaft 12 (as shown in FIG. 2). The pitch angle gradually diminishes or flattens out along the length of the spinner toward the rearward end of the spinner. Preferably, the pitch angle flattens out at approximately the midpoint 25 along the length of the spinner 20.

A second spinner 30 also in the shape of a half loop element is similarly mounted to the shaft 12. The forward end 32 has an aperture 34 and the rearward end 36 has a aperture 38 for mounting the second spinner 30 to the shaft 12. Each aperture 34, 38 is larger than the diameter of the shaft 12 so that the second spinner 30 hangs loosely from the shaft 12. The forward end 32 of the second spinner 30 also has a pitch angle so that the retrieval of the lure 10 through the water will cause the second spinner 30 to rotate about the axis of the shaft 12. The pitch angle of the second spinner 30 should be approximately the same angle as the pitch angle of the first spinner 20 so that each spinner rotates at approximately the same speed, but the pitch angle of the second spinner 30 should be opposite to the pitch angle of the first spinner 20 so that the spinners rotate oppositely to each other, i.e., if the first spinner 20 rotates clockwise, then the second spinner 30 should rotate counterclockwise. This opposite rotation of the two spinners causes the torque on the shaft, and thus the torque on the fishing line, to approximately cancel out.

The torque on the shaft and fishing line caused by a rotating spinner is directly related to the surface area of the spinner. The surface area of the first spinner 20 or the second spinner 30 can be calculated by simply multiplying the length by the width. In order that the net torque on the shaft be approximately zero, the surface areas of the two spinners should be approximately equal.

As shown in FIG. 1, the second spinner 30 is mounted to the shaft 12 within the span of the first spinner 20. Since the first spinner 20 is therefore longer than the second spinner 30, the second spinner 30 must be wider than the first spinner 20, if both spinners are to have approximately equal surface areas.

A preferred embodiment has the first spinner 20 having a length of 3.0" and a width of 0.1875". The second spinner 30 has a length of 1.5" and a width of 0.375". Both spinners then have a surface area of 0.5625 square inches.

A plurality of generally spherical spacing balls or beads 15 are rotatably and slideably mounted on the shaft 12. The beads 15 can be decorated, either in solid or multicolor designs, to attract fish. The beads 15 may be transparent, translucent or opaque. A generally spherical spacing ball or bead 17, which can be similarly decorated, is preferably fixedly mounted, against both rotation and sliding, to shaft 12 immediately to the rear of the end 36 of the second spinner 30. A generally spherical spacing ball or bead 19 is fixedly mounted to the shaft 12 immediately to the rear of the end 26 of the first spinner 20. The practice of mounting beads 17 and 19 fixedly to the shaft 12 also mitigates the twist or torque to the fishing line.

FIG. 3 shows another embodiment of the present invention. The first spinner 60 is a half loop element and the second spinner 65 is a full loop element. The second spinner 65 is mounted on the shaft 62, shown here in the alternative braided configuration, within the span of the first spinner 60. The first spinner 60 has a pitch angle to the shaft opposite to the pitch angle of the second spinner 65 so that the spinners rotate about the axis of the shaft 62 in opposite directions. The preferable pitch angle for a full loop spinner is also 45°. The length and width of each spinner is selected so that their surface areas are approximately equal. For a spinner that is a full loop, such as second spinner 65, the length is actually the circumference of the full loop. For the embodiment shown in FIG. 3, the length of each spinner can be 4.0" and the width of each spinner can be 0.1875". The surface area of each spinner would then be 0.75 square inches.

Also, as shown in FIG. 3, the spacing beads can be shaped other than as spherical balls, e.g., the beads may be barrel-shaped. Alternatively, cylindrical spacers can be used as shown in FIG. 4.

Figure 4:
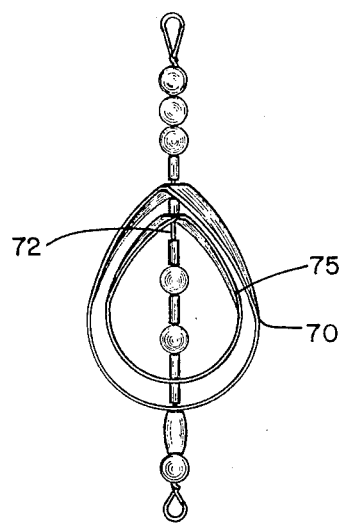
FIG. 4 shows an alternate embodiment having a single shaft with two full loop spinners, one mounted inside the span of the other.

FIG. 4 shows an embodiment having a single shaft 72 with two full loop spinners. The first spinner 70 surrounds the second spinner 75. Again opposite pitch angles are utilized to generate opposite spinner rotations. The second spinner 75 should be wider than the first spinner 70. The length of the first spinner 70 can be 5.0" with a width of 0.25". The second spinner 75 can have a length of 4.0" and a width of 0.3125". The surface area of each spinner would then be 1.25 square inches.

Figure 5:
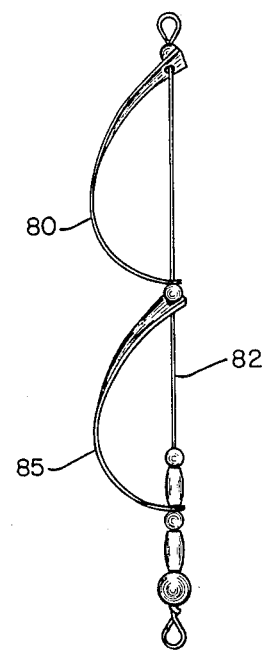
FIG. 5 shows an alternate embodiment having a single shaft with two half loop spinners in tandem.

The embodiment of FIG. 5 shows a single shaft 82 with two half loop spinners 80, 85 mounted in tandem. Again, opposite pitch angles and equal surface areas are utilized.

Figure 6:
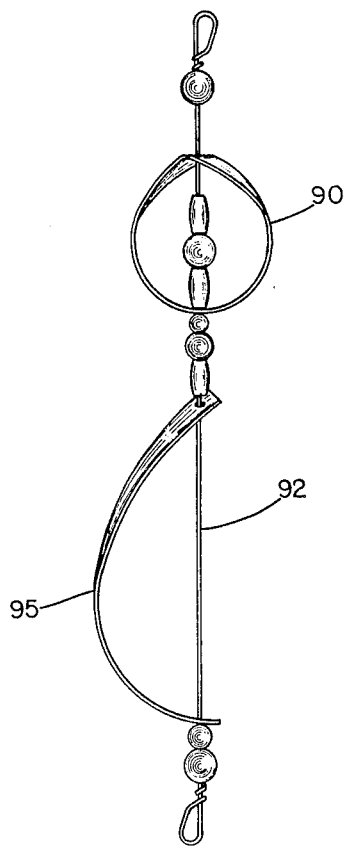
FIG. 6 shows an alternate embodiment having a single shaft with a full loop spinner in tandem and in front of a half loop spinner.

FIG. 6 shows another embodiment having a single shaft 92 with a full loop spinner 90 in tandem with a half loop spinner 95. Preferably the full loop spinner 90 is placed forward of the half loop spinner 95.

Figure 7:
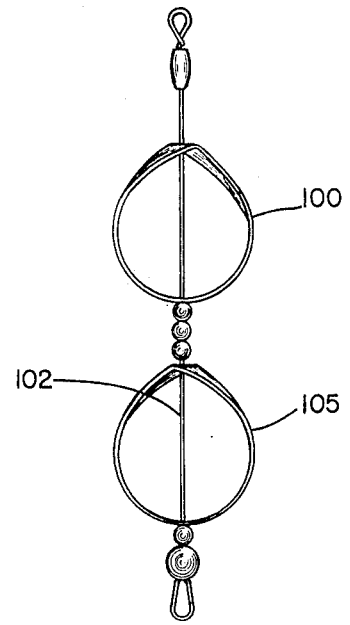
FIG. 7 shows an alternate embodiment having a single shaft with two full loop spinners in tandem.

FIG. 7 shows an alternate embodiment of the present invention in which two full loop spinners 100, 105 are mounted in tandem on a single shaft 102.

Figure 8:
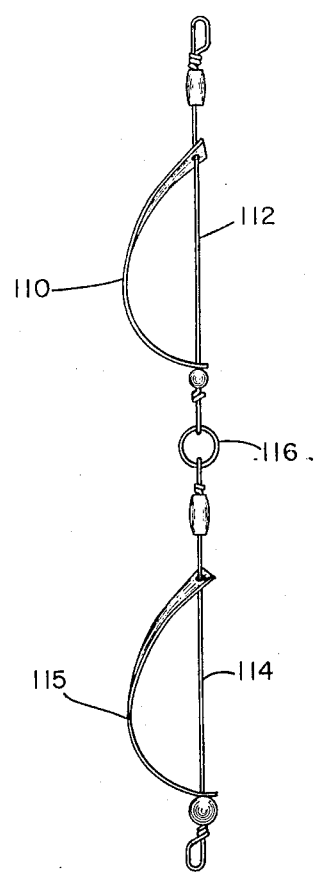
FIG. 8 shows an alternate embodiment having two shafts in tandem with two half loop spinners in tandem.

FIG. 8 shows an embodiment in which the shaft is segmented into a forward shaft 112 and a rearward shaft 114 connected by a ring means 116. The first spinner 110 is a half loop element mounted on the forward shaft 112. The second spinner 115 is also a half loop element mounted on the rearward shaft 114. The torque or twist on the fishing line is minimized by using this dual shaft arrangement.

Figure 9:
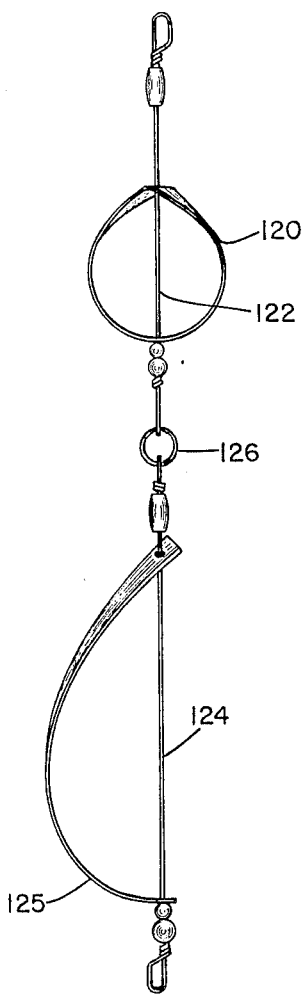
FIG. 9 shows an alternate embodiment having two shafts in tandem with a full loop spinner in front of a half-loop spinner.

The embodiment shown in FIG. 9 has a dual shaft 122, 124 connected by a ring means 126. The first spinner 120 is a full loop element and the second spinner 125 is a half loop element. Preferably the full loop spinner 120 is mounted forward of the half loop spinner 125 in the direction of travel of the lure during retrieve.

Figure 10:
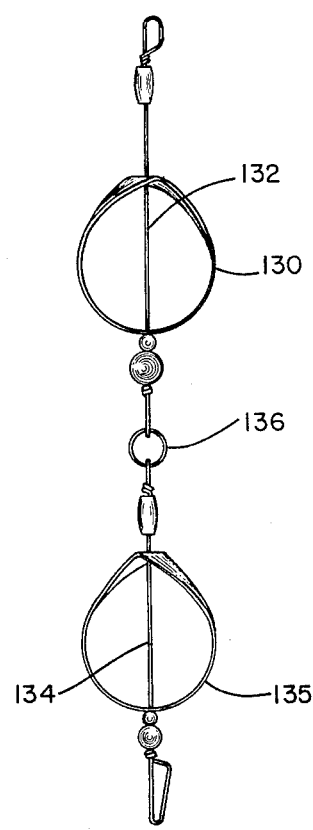
FIG. 10 shows an alternate embodiment having two shafts in tandem with two full loop spinners in tandem.

FIG. 10 shows another embodiment of the present invention having a dual shaft 132, 134 connected by a ring means 136. Each shaft has mounted thereon a full loop spinner 130, 135.

FIG. 11 shows two half loop spinners 140, 145 mounted on a shaft 142. Each half loop spinner is made up of multiple straight line segments bent to effect a half loop. FIG. 12 shows a shaft 152 with a half loop spinner 150 and a full loop spinner 155 each made up of multiple straight line segments. Any of the other combinations of half loop and full loop spinners can also be adapted as multiple straight line segments.

During the course of fishing using the spinner fishing lure of the present invention, a fisherman will intermittently stop the forward retrieve of the lure. Whenever such forward retrieval stops, the lure will begin to sink deeper in the water. During this descent phase, the half loop spinners, such as those shown in FIG. 1, will swing in a pendulum-like motion in opposite directions to each other and criss-cross under the shaft. This can be attributed to the opposite pitch angles on the surface of each spinner. This criss-cross pendulum-like motion of the spinners causes the lure to oscillate or flutter as it descends thus giving the lure the appearance of natural bait and therefore attracting fish.

While the invention has been illustrated with respect to several specific embodiments thereof, these embodiments should be considered as illustrative rather than limiting. Various modifications and additions may be made and will be apparent to those skilled in the art. For example, the surface of each spinner can be decorated with brightly colored paint or even multiple colors of paint in designs or patterns conventional in the art. Accordingly, the invention should not be limited by the foregoing description, but rather should be defined only by the following claims.

We claim:
1. A fishing lure comprising
(a) a shaft having means for connecting a fishing line to one end of the shaft for retrieving the lure during fishing,
(b) means for connecting a fishhook to the opposite end of the shaft,
(c) a first spinner comprising a generally rectangularly shaped half loop ribbon member having aperture means at each end thereof for rotatably mounting the first spinner to the shaft, said ribbon member being pitched at an angle to the shaft at the location at which said first spinner is mounted to the shaft,
(d) a second spinner comprising a generally rectangularly shaped half loop ribbon member having aperture means at each end thereof for rotatably mounting the second spinner to the shaft, said ribbon member being pitched at an angle to the shaft at the location at which said second spinner is mounted to the shaft, said angle being opposite to the angle of pitch of said first spinner,
whereby as the lure is retrieved during fishing the spinners will rotate about the shaft in opposite directions to each other so that the rotational forces of each spinner approximately cancel out.

2. The fishing lure of claim 1 wherein the first spinner and the second spinner have approximately equal surface areas.

3. The fishing lure of claim wherein the second spinner is mounted on the shaft within the span of the first spinner.

4. The fishing lure of claim 3 wherein the second spinner is wider and shorter that the first spinner.

5. The fishing lure of claim 1 wherein the second spinner is mounted on the shaft in tandem with the first spinner.

6. The fishing lure of claim 1 wherein said first spinner and said second spinner are each a curvilinear member.

7. The fishing lure of claim 1 wherein said first spinner and said second spinner are each made up of multiple straight line segments.

8. The fishing lure of claim 1 wherein the aperture means are larger than the diameter of the shaft so that each spinner hangs loosely from the shaft.

9. The fishing lure of claim 1 wherein a spacing bead is fixedly mounted to the shaft immediately to the rear of the end of each spinner.

10. The fishing lure of claim 1 wherein the range of the pitch angle of each ribbon member is greater than 0° and less than 90°.

11. The fishing lure of claim 10 wherein the pitch angle is preferably 45°.

12. A fishing lure comprising
(a) a forward shaft having means for connecting a fishing line thereto,
(b) a rearward shaft having means for connecting a fishhook thereto,
(c) means for connecting the forward shaft to the rearward shaft,
(d) a first spinner comprising a generally rectangularly shaped half loop ribbon member having aperture means at each end thereof for rotatably mounting the first spinner to the forward shaft, said ribbon member being pitched at an angle to the shaft at the location at which said first spinner is mounted to the shaft, and
(e) a second spinner comprising a generally rectangularly shaped half loop ribbon member having aperture means at each end thereof for rotatably mounting the second spinner to the rearward shaft, said ribbon member being pitched at an angle to the shaft at the location at which said second spinner is mounted to the shaft, said angle being opposite to the angle of pitch of said first spinner,
whereby as the lure is retrieved during fishing the spinners will rotate about the shafts in opposite directions to each other so that the rotational forces approximately cancel out.

13. The fishing lure of claim 12 wherein the first spinner and the second spinner have approximately equal surface areas.

14. The fishing lure of claim 12 wherein the means for connecting the forward shaft to the rearward shaft is a ring means.

15. The fishing lure of claim 12 wherein the aperture means is larger than the diameter of the shaft so that each spinner hangs loosely from the shaft.

16. The fishing lure of claim 12 wherein a spacing bead is fixedly mounted to each shaft immediately to the rear of the end of each spinner.

17. The fishing lure of claim 12 wherein the range of the pitch angle of each ribbon member is greater than 0° and less than 90°.

18. The fishing lure of claim 17 wherein the pitch angle is preferably approximately 45°.

19. The fishing lure of claim 12 wherein said first spinner and said second spinner are each a curvilinear member.

20. The fishing lure of claim 12 wherein said first spinner and said second spinner are each made up of multiple straight line segments.

21. A fishing lure comprising
(a) a shaft having means for connecting a fishing line to the front end of the shaft and means for connecting a fishhook to the rear end of the shaft,
(b) a first spinner comprising a rectangular member, means for rotatably mounting the front end of the first spinner to the forward end of the shaft, means for rotatably mounting the rear end of the first spinner to the rearward end of the shaft, the front end of the first spinner being pitched at an angle from perpendicular to the shaft at the location at which the front end is mounted to the shaft, and
(c) a second spinner comprising a rectangular member, means for rotatably mounting the forward end of the second spinner to the front end of the shaft, means for mounting the rearward end of the second spinner to the rear end of the shaft, the front end of the second spinner being pitched at an angle from perpendicular to the shaft at the location at which the front end is mounted to the shaft whereby as the lure is retrieved during fishing the first spinner will rotate about the shaft and the second spinner will rotate about the shaft in a direction opposite to the rotation of the first spinner so that the rotational forces of each spinner will approximately cancel out.

22. A fishing lure comprising
(a) a shaft including means for connecting a fishing line to the front end of the shaft and means for connecting a fishhook to the rear end of the shaft,
(b) a first spinner comprising a first loop including means for rotatably mounting the front end of the first loop to the shaft and means for rotatably mounting the rear end of the first loop to the shaft,
(c) a second spinner comprising a second loop including means for rotatably mounting the front end of the second loop to the shaft and means for mounting the rear end of the second loop to the shaft,
(d) the first spinner having a forward surface pitched at an angle from perpendicular to the shaft at the location at which the front end of the first loop intersects the shaft, and the second spinner having a forward surface pitched at an angle to the shaft at the location at which the front end of the second loop intersects the shaft, the pitch angle of the second spinner being opposite from the pitch angle of the first spinner so that during retrieval of each spinner will rotate about the shaft in a direction opposite to the direction of the other spinner.

23. A fishing lure comprising
(a) a shaft having means for connecting a fishing line to one end of the shaft for retrieving the lure during fishing,
(b) means for connecting a fishhook to the opposite end of the shaft,
(c) a first spinner comprising a generally rectangularly shaped half loop ribbon member having aperture means at each end thereof for rotatably mounting the first spinner to the shaft, said ribbon member being pitched at an angle to the shaft at the location at which said first spinner is mounted to the shaft,
(d) a second spinner comprising a generally rectangularly shaped full loop ribbon member having aperture means therein for rotatably mounting the second spinner to the shaft, said ribbon member being pitched at an angle to the shaft at the location at which said second spinner is mounted to the shaft, said angle being opposite to the angle of pitch of said first spinner,
whereby as the lure is retrieved during fishing the spinners will rotate about the shaft in opposite directions to each other so that the rotational forces of each spinner approximately cancel out.

24. The fishing lure of claim 23 wherein the first spinner and the second spinner have approximately equal surface areas.

25. The fishing lure of claim 23 wherein the second spinner is mounted on the shaft within the span of the first spinner.

26. The fishing lure of claim 23 wherein said first spinner and said second spinner are each a curvilinear member.

27. The fishing lure of claim 23 wherein said first spinner and second spinner are each made up of multiple straight line segments.

28. The fishing lure of claim 23 wherein the aperture means is larger than the diameter of the shaft so that each spinner hangs loosely from the shaft.

29. The fishing lure of claim 23 wherein a spacing bead is fixedly mounted to the shaft immediately to the rear of the end of each spinner.

30. The fishing lure of claim 23 wherein the range of the pitch angle of each ribbon member is greater than 0° and less than 90°.

31. The fishing lure of claim 30 wherein the pitch angle is preferably 45°.

32. A fishing lure comprising
(a) a shaft having means for connecting a fishing line to one end of the shaft for retrieving the lure during fishing,
(b) means for connecting a fishhook to the opposite end of the shaft,
(c) a first spinner comprising a generally rectangularly shaped full loop ribbon member having aperture means therein for rotatably mounting the first spinner to the shaft, said ribbon member being pitched at an angle to the shaft at the location at which said first spinner is mounted to the shaft,
(d) a second spinner comprising a generally rectangularly shaped half loop ribbon member having aperture means at each end thereof for rotatably mounting the second spinner to the shaft, said ribbon member being pitched at an angle to the shaft at the location at which said second spinner is mounted to the shaft, said angle being opposite to the angle of pitch of said first spinner,
whereby as the lure is retrieved during fishing the spinners will rotate about the shaft in opposite directions to each other so that the rotational forces of each spinner approximately cancel out.

33. The fishing lure of claim 32 wherein the first spinner and the second spinner have approximately equal surface areas.

34. The fishing lure of claim 32 wherein the second spinner is mounted on the shaft in tandem with the first spinner.

35. The fishing lure of claim 32 wherein said first spinner and said second spinner are each a curvilinear member.

36. The fishing lure of claim 32 wherein the aperture means is larger than the diameter of the shaft so that each spinner hangs loosely from the shaft.

37. The fishing lure of claim 32 wherein a spacing bead is fixedly mounted to the shaft immediately to the rear of the end of each spinner.

38. The fishing lure of claim 32 wherein the range of the pitch angle of each ribbon member is greater than 0° and less than 90°.

39. The fishing lure of claim 38 wherein the pitch angle is preferably 45°.

40. A fishing lure comprising
(a) a shaft having means for connecting a fishing line to one end of the shaft for retrieving the lure during fishing,
(b) means for connecting a fishhook to the opposite end of the shaft,
(c) a first spinner comprising a generally rectangularly shaped full loop ribbon member having aperture means therein for rotatably mounting the first spinner to the shaft, said ribbon member being pitched at an angle to the shaft at the location at which said first spinner is mounted to the shaft,
(d) a second spinner comprising a generally rectangularly shaped full loop ribbon member having aperture means therein for rotatably mounting the second spinner to the shaft, said ribbon member being pitched at an angle to the shaft at the location at which said second spinner is mounted to the shaft, said angle being opposite to the angle of pitch of said first spinner,
whereby as the lure is retrieved during fishing the spinners will rotate about the shaft in opposite directions to each other so that the rotational forces of each spinner approximately cancel out.

41. The fishing lure of claim 40 wherein the first spinner and the second spinner have approximately equal surface areas.

42. The fishing lure of claim 40 wherein the second spinner is mounted on the shaft within the span of the first spinner.

43. The fishing lure of claim 42 wherein the second spinner is wider and shorter than the first spinner.

44. The fishing lure of claim 40 wherein the second spinner is mounted on the shaft in tandem with the first spinner.

45. The fishing lure of claim 40 wherein said first spinner and said second spinner are each a curvilinear member.

46. The fishing lure of claim 40 wherein the aperture means is larger than the diameter of the shaft so that each spinner hangs loosely from the shaft.

47. The fishing lure of claim 40 wherein a spacing bead is fixedly mounted to the shaft immediately to the rear of the end of each spinner.

48. The fishing lure of claim 40 wherein the range of the pitch angle of each ribbon member is greater than 0° and less than 90°.

49. The fishing lure of claim 48 wherein the pitch angle is preferably 45°.

50. A fishing lure comprising
(a) a forward shaft having means for connecting a fishing line thereto,
(b) a rearward shaft having means for connecting a fishhook thereto,
(c) means for connecting the forward shaft to the rearward shaft,
(d) a first spinner comprising a generally rectangularly shaped full loop ribbon member having aperture means therein for rotatably mounting the first spinner to the forward shaft, said ribbon member being pitched at an angle to the shaft at the location at which said first spinner is mounted to the shaft, and
(e) a second spinner comprising a generally rectangularly shaped half loop ribbon member having aperture means at each end thereof for rotatably mounting the second spinner to the rearward shaft, said ribbon member being pitched at an angle to the shaft at the location at which said second spinner is mounted to the shaft, said angle being opposite to the angle of pitch of said first spinner,
whereby as the lure is retrieved during fishing the spinners will rotate about the shafts in opposite directions to each other so that the rotational forces approximately cancel out.

51. The fishing lure of claim 50 wherein the first spinner and the second spinner have approximately equal surface areas.

52. The fishing lure of claim 50 wherein said first spinner and said second spinner are each a curvilinear member.

53. The fishing lure of claim 50 wherein the means for connecting the forward shaft to the rearward shaft is a ring means.

54. The fishing lure of claim 50 wherein the aperture means is larger than the diameter of the shaft so that each spinner hangs loosely from the shaft.

55. The fishing lure of claim 50 wherein a spacing bead is fixedly mounted to the shaft immediately to the rear of the end of each spinner.

56. The fishing lure of claim 50 wherein the range of the pitch angle of each ribbon member is greater than 0° and less than 90°.

57. The fishing lure of claim 56 wherein the pitch angle is preferably 45°.

58. A fishing lure comprising
(a) a forward shaft having means for connecting a fishing line thereto, (b) a rearward shaft having means for connecting a fishhook thereto,
(c) means for connecting the forward shaft to the rearward shaft,
(d) a first spinner comprising a generally rectangularly shaped full loop ribbon member having aperture means therein for rotatably mounting the first spinner to the forward shaft, said ribbon member being pitched at an angle to the shaft at the location at which said first spinner is mounted to the shaft, and
(e) a second spinner comprising a generally rectangularly shaped full loop ribbon member having aperture means therein for rotatably mounting the second spinner to the rearward shaft, said ribbon member being pitched at an angle to the shaft at the location at which said second spinner is mounted to the shaft, said angle being opposite to the angle of pitch of said first spinner, whereby as the lure is retrieved during fishing the spinners will rotate about the shafts in opposite directions to each other so that the rotational forces approximately cancel out.

59. The fishing lure of claim 58 wherein the first spinner and the second spinner have approximately equal surface areas.

60. The fishing lure of claim 58 wherein said first spinner and said second spinner are each a curvilinear member.

61. The fishing lure of claim 58 wherein the means for connecting the forward shaft to the rearward shaft is a ring means.

62. The fishing lure of claim 58 wherein the aperture means is larger than the diameter of the shaft so that each spinner hangs loosely from the shaft.

63. The fishing lure of claim 58 wherein a spacing bead is fixedly mounted to the shaft immediately to the rear of the end of each spinner.

64. The fishing lure of claim 58 wherein the range of the pitch angle of each ribbon member is greater than 0° and less than 90°.

65. The fishing lure of claim 64 wherein the pitch angle is preferably 45°.

* * * * *